United States Patent
Hofbauer

(10) Patent No.: US 6,722,458 B2
(45) Date of Patent: Apr. 20, 2004

(54) MULTI-ENGINE DRIVE SYSTEM FOR A VEHICLE

(75) Inventor: Peter Hofbauer, West Bloomfield, MI (US)

(73) Assignee: FEV Motorentechnik GmbH, Aachen (DE)

( * ) Notice: Subject to any disclaimer, the term of this patent is extended or adjusted under 35 U.S.C. 154(b) by 88 days.

(21) Appl. No.: 09/938,514

(22) Filed: Aug. 27, 2001

(65) Prior Publication Data

US 2003/0037978 A1 Feb. 27, 2003

(51) Int. Cl.⁷ ................................................ B60K 1/00
(52) U.S. Cl. .................... 180/65.4; 180/65.1; 180/65.3; 475/5
(58) Field of Search ................. 180/65.1, 65.2, 180/65.3, 65.4, 65.6, 65.7, 65.8, 300, 301, 306, 65.5; 74/661, 665 A, 665 B; 475/334, 5, 2

(56) References Cited

U.S. PATENT DOCUMENTS

| | | | | |
|---|---|---|---|---|
| 3,194,087 A | * | 7/1965 | Kronogard | 74/661 |
| 4,132,131 A | * | 1/1979 | DeBruyne | 475/334 |
| 4,392,393 A | * | 7/1983 | Montgomery | 74/661 |
| 4,533,011 A | * | 8/1985 | Heidemeyer et al. | 180/65.2 |
| 4,829,850 A | * | 5/1989 | Soloy | 74/661 |
| 5,492,189 A | * | 2/1996 | Kriegler et al. | 180/65.2 |
| 5,495,912 A | * | 3/1996 | Gray et al. | 180/65.4 |
| 6,306,056 B1 | * | 10/2001 | Moore | 180/65.1 |

\* cited by examiner

*Primary Examiner*—Brian L. Johnson
*Assistant Examiner*—Hau Phan
(74) *Attorney, Agent, or Firm*—Venable LLP; Robert Kinberg

(57) ABSTRACT

A drive system for a vehicle includes wheel-carrying first and second axles; a storage battery; and a motor/generator selectively operable in motor or generator modes. The motor/generator is connected to the storage battery and cooperates with one of the axles for applying electric energy to the battery when operating in the generator mode and for applying a driving torque to the axle when operating in the motor mode. The drive system further has first and second internal-combustion engines; a transmission connected to the first engine; a first clutch for selectively connecting the transmission to or disconnecting the transmission from, one of the axles; and a second clutch for selectively connecting the second engine to or disconnecting the second engine from, the transmission.

10 Claims, 5 Drawing Sheets

MULTI-ENGINE DRIVE SYSTEM FOR A VEHICLE

BACKGROUND OF THE INVENTION

For reducing the fuel consumption in automotive vehicles it has been attempted to at least partially recuperate the kinetic energy released during braking or coasting (that is, during vehicle travel without supplying fuel to the engine in gear). For this purpose, for example, a heavy flywheel has been provided which, during coasting or braking, was coupled to the vehicle wheels by means of a switchable clutch. As a result, kinetic energy of the moving vehicle could be stored upon acceleration of the flywheel and could be utilized for a subsequent engine start and/or engine acceleration. The disadvantage of such a system resides in the additional significant weight of the flywheel which must be driven by the internal-combustion engine as an additional mass.

Further, in conjunction with the above-outlined flywheel system, it has been attempted to provide an electric motor/generator which could be coupled to the running vehicle wheels by a switchable clutch during coasting and/or braking. As a result, the kinetic energy of the vehicle released during coasting or braking could be converted into electrical energy by switching the motor/generator to operate in the generator mode and storing the generated electric energy in a storage battery. For starting and/or acceleration the motor/generator is switched to operate in the motor mode and is supplied by current from the battery so that the electric energy is again converted into kinetic energy. To be able to store appreciable electric energy, however, large-dimension and thus heavy-weight batteries are required. Therefore, in such a system too, in the normal operation a large additional load has to be moved by the internal-combustion engine.

In both above-outlined systems the internal-combustion engine is so designed that it is capable of supplying the energy requirement for the entire load range of the vehicle, while the recuperating systems merely serve for performing auxiliary functions. Since the internal-combustion engine must be designed for the maximum load, but it operates under maximum load conditions only in exceptional cases, that is, the engine during most of its service life is not operated in the optimum rpm and load range, the achievable fuel economy is far from optimal.

SUMMARY OF THE INVENTION

It an object of the invention to provide an improved drive system for a vehicle with which a significant reduction in fuel consumption is feasible while utilizing possibilities to recuperate kinetic energy.

This object and others to become apparent as the specification progresses, are accomplished by the invention, according to which, briefly stated, the drive system for a vehicle includes wheel-carrying first and second axles; a storage battery; and a motor/generator selectively operable in motor or generator modes. The motor/generator is connected to the storage battery and cooperates with one of the axles for applying electric energy to the battery when operating in the generator mode and for applying a driving torque to the axle when operating in the motor mode. The drive system further has first and second internal-combustion engines; a transmission connected to the first engine; a first clutch for selectively connecting the transmission to or disconnecting the transmission from, one of the axles; and a second clutch for selectively connecting the second engine to or disconnecting the second engine from, the transmission.

The invention as outlined above provides an at least three-stage drive system wherein the vehicle may be driven from the motor/generator, when operating in the motor mode, by current taken from the battery. During coasting and/or braking electric energy may be fed back into the battery by switching the motor/generator to operate in the generator mode. If in the motor mode of the motor/generator the given nominal output is exceeded because of the extent of driving energy required by the load, the first (primary) clutch is engaged and thus the first engine is operatively coupled to the same drive axle or to an additional drive axle. Thus, the increased torque requirement then may be met either jointly with the motor/generator in the motor mode or alone by the first engine. By providing a suitable electric regulator between the battery and the motor/generator, it is ensured that in the motor mode electric energy is drawn from the battery only up to a minimum value. If, because of unfavorable load conditions, the electric energy drawn from the battery falls below such a minimum value, the torque requirement for the further load has to be made available by the first internal-combustion engine alone. If a torque is required which is in excess of the given nominal output of the first internal-combustion engine, then the second internal-combustion engine, connected to the first internal-combustion engine by a suitable transmission gearing, is coupled into the power train by the second (additional) clutch. In this manner additional driving energy is available from the second internal-combustion engine. By a proper design and assigned load ranges such an arrangement allows the operation of the two internal-combustion engines in the given load ranges at a smallest fuel consumption range.

Tests have shown that in city driving automotive vehicles are driven at least 50% of the operating time in a "cruising" mode, in which only a small amount of energy is needed by the drive system. An increase of energy input is required only for accelerations and uphill travel. In city driving, because of frequent braking, a significant recuperation of the electrical energy from the kinetic energy is possible since the motor/generator then operates in the generator mode. As a result, in city driving it is feasible to sustain a "cruising" mode for a 1.5-ton vehicle with a 10 kW motor/generator.

For accelerations and uphill travel, the first internal-combustion engine is used which has a higher power than that of the motor/generator. Such a higher power may be, for example, twice the power of the motor/generator. Further, for loads that have additional torque requirements, the second internal-combustion engine is activated which has a power higher than that of the first internal-combustion engine. Thus, according to the invention the motor/generator has a small nominal power and the second engine has a power which is at least as high as the nominal power of the first engine. In case of large loads both engines may be operated simultaneously. It is expedient, however, if the second engine has a nominal power higher than that of the first engine to ensure a desired operational mode in each instance in the range of the smallest fuel consumption. Accordingly, the first and second engines may be coupled into or out of the drive train by suitable clutches.

According to an advantageous feature of the invention the motor/generator is associated with a first vehicle axle while the engines are associated with a second vehicle axle. This arrangement ensures that the motor/generator is continuously in engagement with the drive train, whereas the two engines may be operatively connected to the drive train in accordance with torque requirements.

In accordance with another advantageous feature of the invention the motor/generator and the engines are associated with a single, common vehicle axle. In such an arrangement it is expedient to connect the motor/generator with the transmission gearing. It is an advantage of such a system that the motor/generator too, may be coupled with the vehicle axle via the switchable first (main) clutch. As a modification, it is feasible to provide that one motor/generator is associated with one drive axle of the vehicle and a further motor/generator and the engines are associated with another vehicle axle. In such an arrangement, as noted before, switchable respective clutches are arranged between the drives and the transmission gearing, while the main clutch is positioned between the transmission gearing and the drive axle.

DESCRIPTION OF THE PREFERRED EMBODIMENTS

Based on current experimental data, a 1500 kg automotive vehicle has the following power requirements:

For sustaining a constant speed of 60 m.p.h. on a level road: 8 kW;

For sustaining a constant speed of 60 m.p.h. on a road having a 6% slope: 35 kW; and For accelerating from zero to 60 m.p.h. in 12 seconds on a level road: 75 kW.

Figure 1:
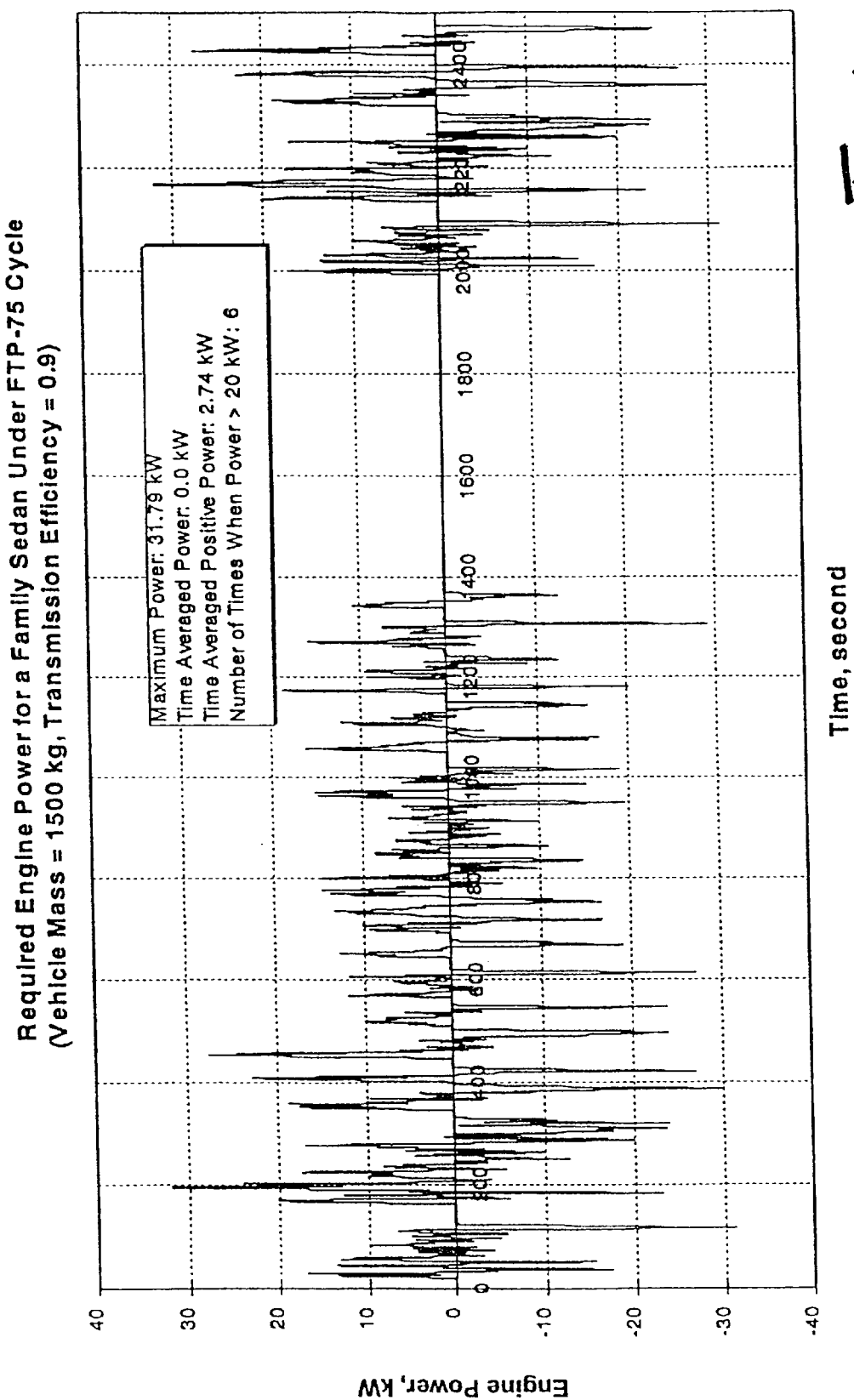
FIG. 1 is a printout illustrating a detected actual engine power v. time in an automotive vehicle.

Further, as may be seen from FIG. 1, it has been found that in city driving additional power needs to be available only for short periods if for the entire operating cycle the drive system had a power of 20 kW. Taking into consideration frictional and slippage losses during acceleration where the maximum loss is less than 8 kW since the vehicle speed during the measuring cycle is less than 60 m.p.h., then a maximum power of 27 kW would be required.

In view of the above, it is feasible to provide a drive system equipped with a motor/generator which, when operating in the motor mode, has a power of 10 kW. Further, a first internal-combustion engine may be provided, for example, a two-cylinder boxer engine having a piston displacement of 800 cm$^3$ and a power of, for example, 27 kW. By connecting together the motor/generator with the first engine, the torque requirements for highway and city driving conditions may be substantially met. In addition, a second engine is provided which has a displacement of, for example, 1600 cm$^3$ and a power of 63 kW which may be, for example, a four-cylinder inline engine of conventional construction. By partially interconnecting the first engine with the second engine and/or with the electric motor/generator during coasting, sufficient power is available for a full load operation or substantial accelerations under normal driving conditions.

Figure 2:
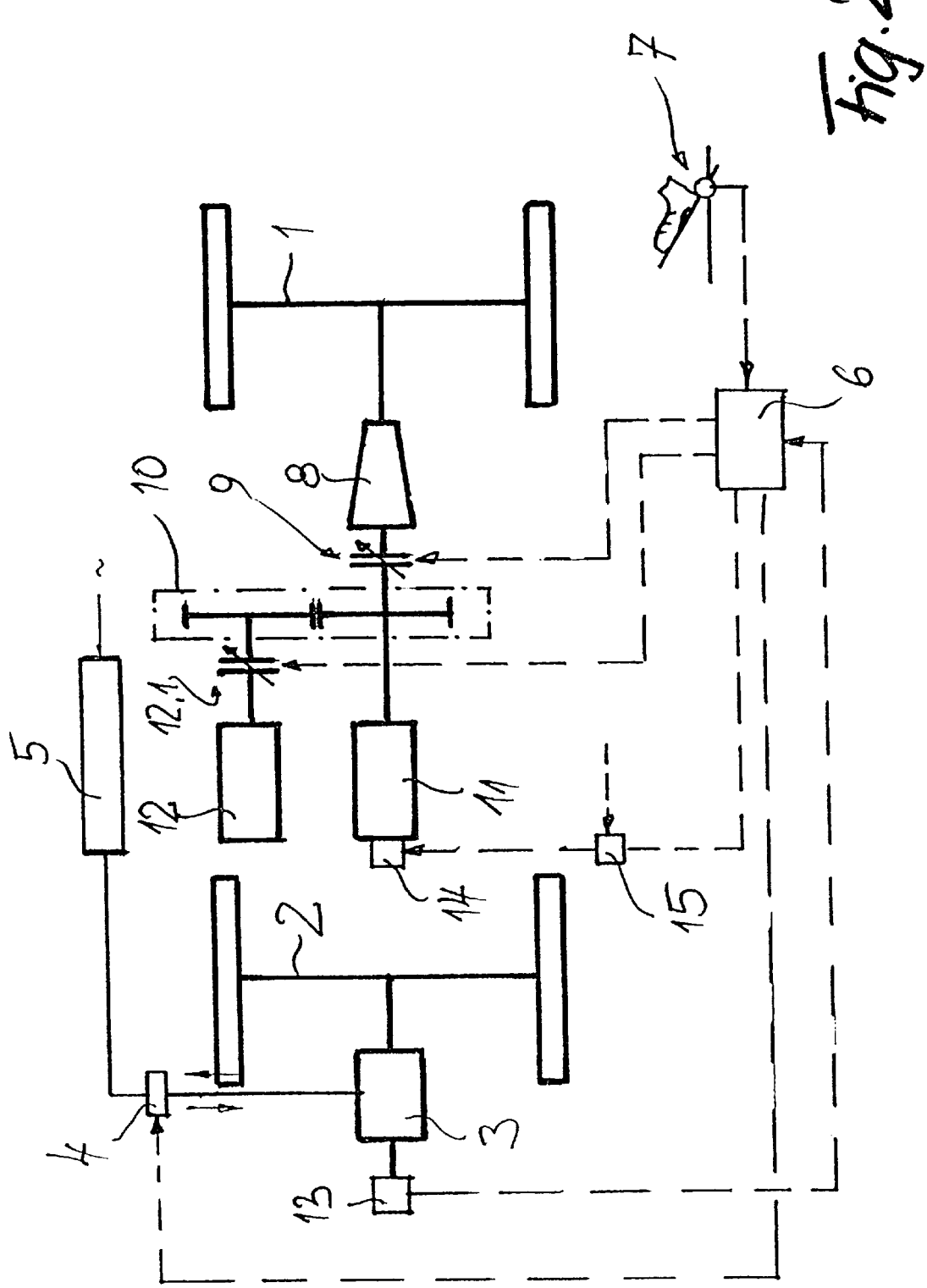
FIG. 2 is a schematic top plan view, with block diagram, of a vehicle drive system according to a preferred embodiment of the invention.

A drive system of the above-outlined type according to the invention is illustrated in FIG. 2. The automotive vehicle is only symbolically shown by its axles 1 and 2 and the vehicle wheels carried thereby. In this embodiment both axles 1 and 2 are driving axles. The driving axle 2 is directly coupled to a motor/generator 3 which may be supplied with current from a storage battery through a regulator 4. The regulator 4 is connected with a central vehicle control apparatus (engine control unit or ECU) 6 which transmits signals representing the torque as selected by the driver via a gas pedal 7.

The driving axle 1 is connected to a transmission via a gearing 8 and a main or first clutch 9. A first internal-combustion engine 11 is connected directly to the transmission 10, whereas a second internal-combustion engine 12 is connected thereto via a second clutch 12.1.

The clutches 9 and 12.1 are electrically connected to the ECU 6 to be controlled (engaged or disengaged) thereby. The gearing 8 may be a simple stepdown gearing or an automatic gearing or a switchable gearing controllable by the ECU 6 or may be a simple torque converter.

A vehicle speed sensing tachogenerator 13 is connected to the motor/generator 3 to continuously apply a signal, representing the vehicle speed, to the ECU 6 in addition to the usual other signals received and processed by the ECU 6.

A conventional starter 14, to be actuated by a switch 15, is connected to the first engine 11.

As to the powers available from the individual systems, the motor/generator 3, the first engine 11 and the second engine 12 may deliver a nominal power of, for example, 10, 27 and 63 kW, respectively.

Accordingly, the first engine 11 has only a small displacement and may be, for example, a two-cylinder engine, preferably a two-cylinder boxer engine, whereas the second engine 12 may be a four-cylinder engine having thus a correspondingly greater displacement.

For starting an automotive vehicle equipped with a drive system as outlined above and taking into consideration the acceleration forces to be applied for the starting step, first, the engine 11 is started by means of the starter 14, while both clutches 9 and 12.1 are disengaged. Thereafter, by engaging the second clutch 12.1 the second engine 12 is started by the first engine 11, while a synchronous run of both engines is ensured by means of non-illustrated regulating and control devices. For setting the vehicle in motion, the clutch 9 is engaged. The gearing 8, for example, an automatic transmission or a torque converter, ensures the start of a shock-free vehicle travel. The desired load is applied as a signal to the ECU 6 by a suitable depression of the gas pedal 7.

Dependent on the control by the ECU 6, the motor/generator 3 may be first rotated by the axle 2 and thus, by a proper setting of the regulator 4, first electric energy is generated dependent on the current requirement of the battery 5.

If, for example, on a level road the desired vehicle speed is reached, the ECU 6 disengages the clutch 12.1 so that the second engine 12 either idles or is switched off. Dependent on torque requirements to satisfy the encountered loads, the vehicle thus may be driven either from the first engine 11 alone, or additionally from the motor/generator 3 which has been switched from the generator-operating mode to the motor-operating mode. The engine 11 is designed such that in the rpm ranges pertinent for such an operation it is driven with an optimum rpm range with respect to the fuel consumption. The ECU 6 may be designed such that the engine 11 delivers the basic torque requirement, and additional torque requirements due to load fluctuations, particularly increases in the load in certain ranges are supplied by the motor/generator 3 operating in the motor mode. As a result, the engine 11 may be operated practically in an even manner.

As soon as a load increase occurs, for example, during accelerations and/or uphill travel, the ECU 6 engages the clutch 12.1. Non-illustrated regulating steps may provide for the possibility of bringing, before engaging the clutch 12.1, the second engine 12 to an rpm predetermined by the gearing 8 to thus ensure a jolt-free vehicle travel.

By combining the clutch 12.1 with a torque converter, the engine 12 may be shut off during low-load travel and is started via the gearing 10 only when required, by engaging the clutch 12.1 during coasting.

Figure 3:
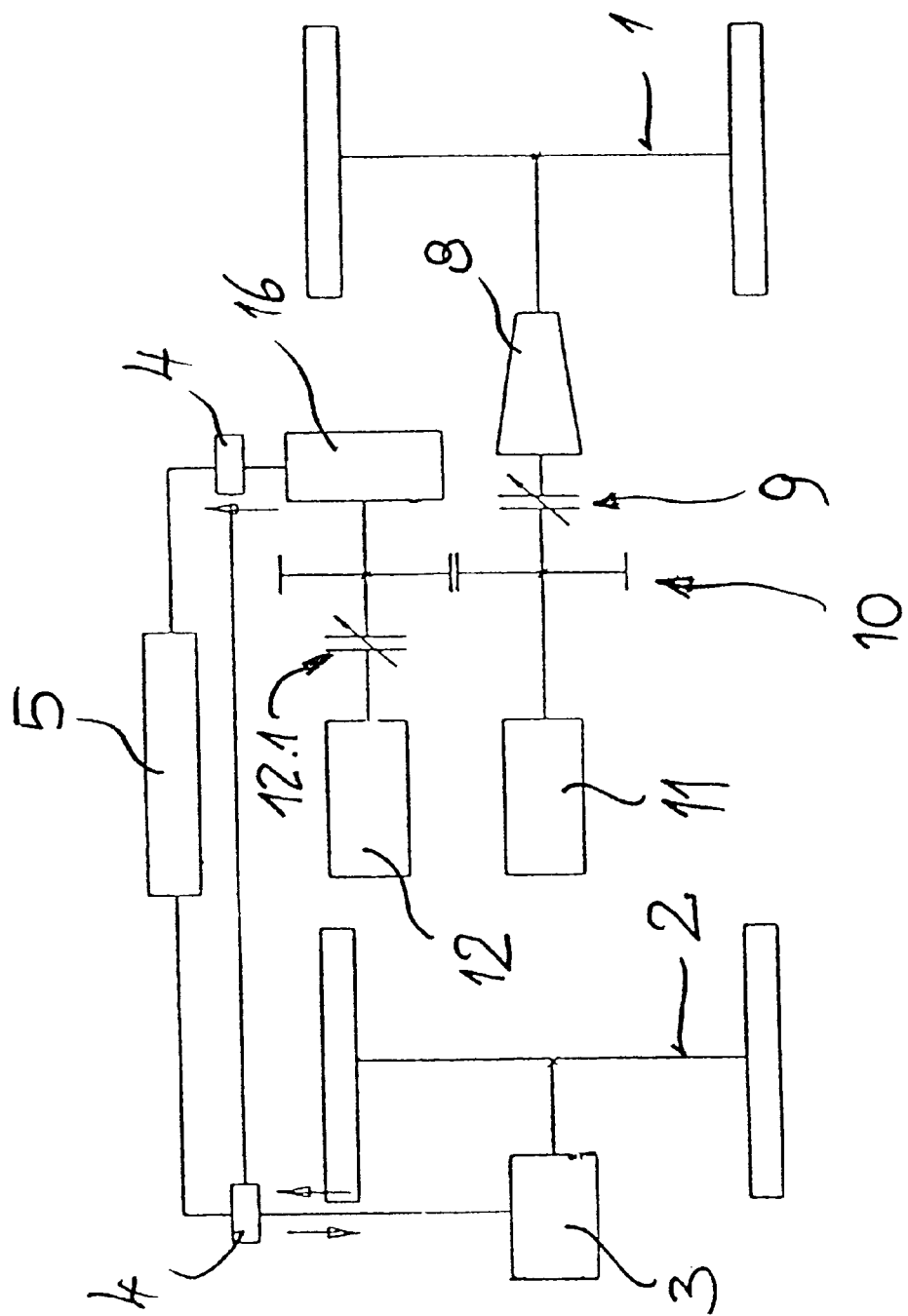
FIG. 3 is a view similar to FIG. 2, showing a variant.

The drive system illustrated in FIG. 3 differs from that shown in FIG. 2 in that an additional generator 16 driven by the axle 1 via the gearing 10 is provided for charging the battery 5. Thus, as early as during the starting of the engine 11 with a disengaged clutch 9 a sufficient current supply for the usual systems of the vehicle is already available. In other respects the drive system of FIG. 3 corresponds to that of FIG. 2 so that for the sake of clarity, the engine control unit and its connection with the individual system components are not shown. In the alternative, the component 16 may be a motor/generator to also deliver a torque to the axle 1.

Figure 4:
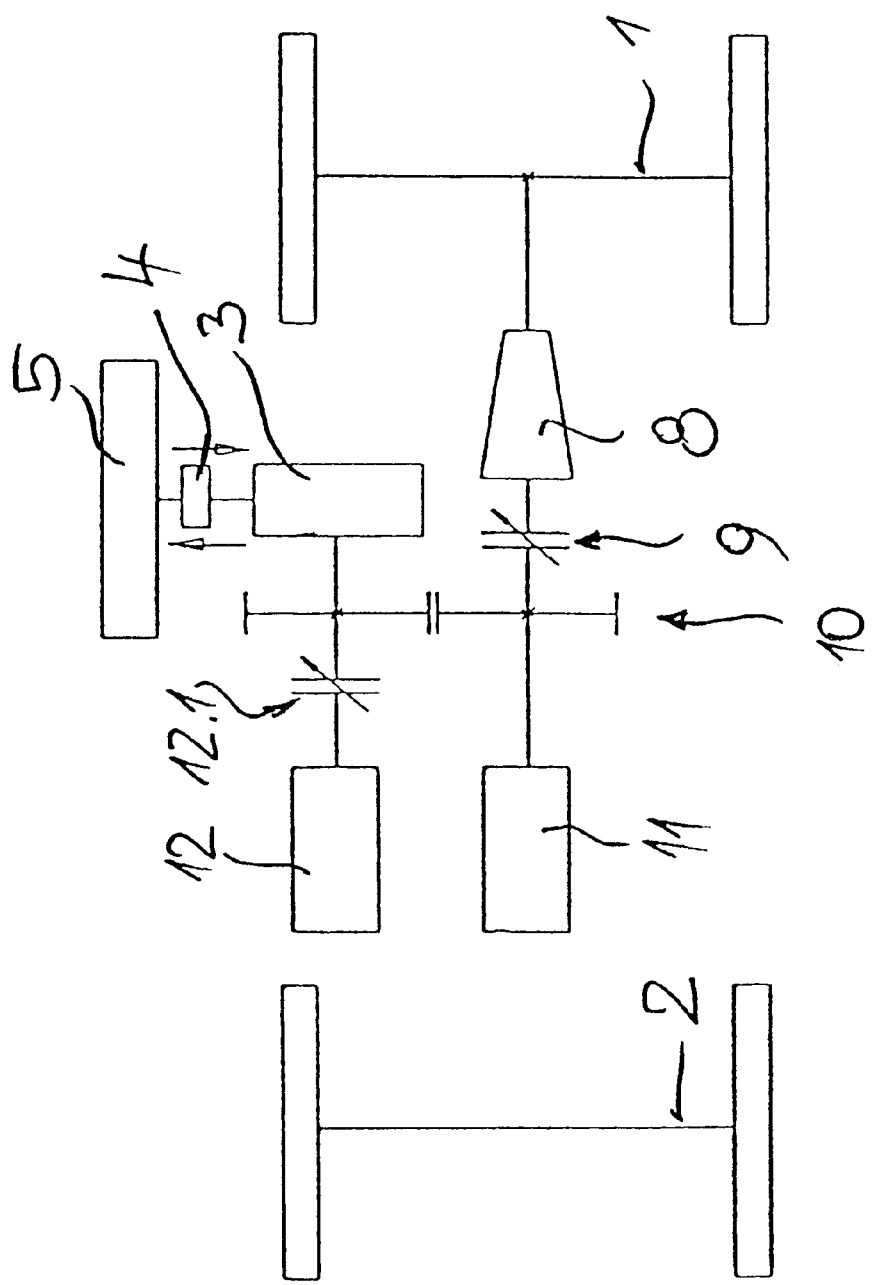
FIG. 4 is a schematic top plan view of a vehicle drive system of a further preferred embodiment having a single driving axle.

FIG. 4 shows a further embodiment of a drive system according to the invention in which solely the axle 1 serves as a driving axle while the axle 2 idles. The structure shown in FIG. 4 essentially corresponds to the FIG. 2 embodiment. The control concerning torque requirement corresponds in structure and function to that of FIG. 2 and thus illustration and further description of such control are omitted.

The FIG. 4 construction differs from that of FIG. 2 only in that the motor/generator 3 is coupled with the transmission gear 10 and thus in addition to its function as a drive motor, it also may serve as a starter for the engine 11. As soon as the engine 11 is started, by engaging the clutch 9, vehicle travel is initiated during which, again, torque requirements to satisfy different loads are met in the same manner by the motor/generator 3 as described in connection with FIG. 2.

Figure 5:
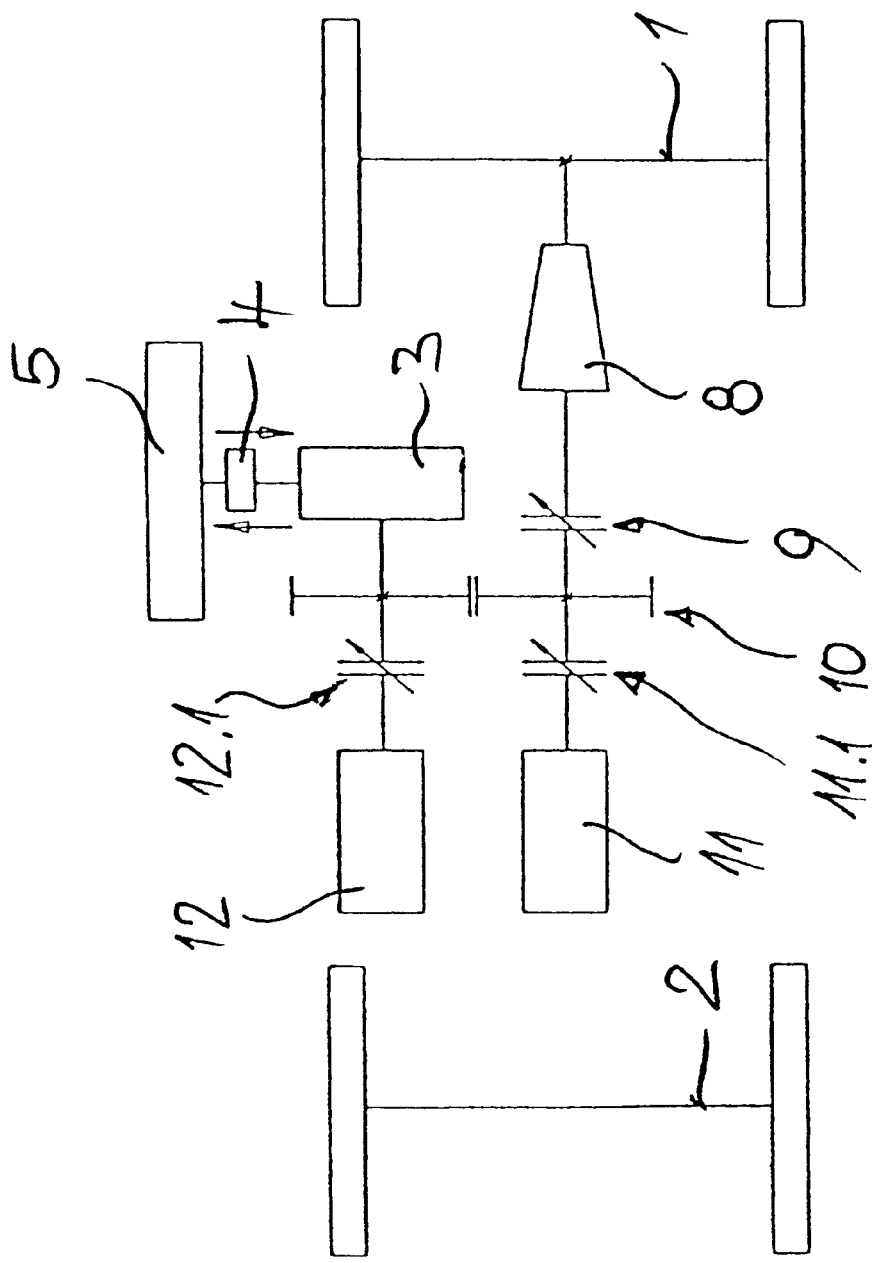
FIG. 5 is a view similar to FIG. 4, showing a variant.

Turning to FIG. 5, the arrangement shown therein differs from that of FIG. 4 only in that an additional clutch 11.1 is provided which is disposed between the transmission 10 and the engine 11. Thus, the engine 11 too, may be uncoupled from the transmission 10 by the clutch 11.1 in addition to the engine 12 which may be uncoupled by the clutch 12.1. Therefore, if desired, torque may be obtained from the motor/generator 3 and/or the engine 11 and/or the engine 12 or with suitable combinations thereof. The motor/generator 3, corresponding to driving conditions and loads, may be operated as a motor or as a generator so that charging of the battery 5 during vehicle travel is ensured. It is similarly feasible, upon disengaging both clutches 11.1 and 12.1, to sustain a cruising operation of the vehicle on a level road exclusively by the motor/generator 3, operating in the motor mode.

In the above-described different drive systems the possibility is provided to partially recuperate the kinetic energy during coasting and braking, by charging the battery 5 as a result of a switchover to the generator mode from the motor mode of the motor/generator 3 if the regulator 4 determines a charging requirement for the battery 5. Such a possibility to recuperate electric energy from the kinetic energy is provided for all driving conditions because in all the described driving conditions the motor/generator 3 may be switched over to the generator mode during coasting and braking.

From the foregoing description of the drive system it may be readily seen that more than two internal-combustion engines may be used. Also, a combination is feasible where the axle 2 is directly and alone connected with a motor/generator and the axle 1, as shown in FIG. 4, is also connected with a motor/generator. The power stepdown between the individual drives, that is, the motor/generator, the first, second or additional internal-combustion engines may be coordinated dependent on the power requirements of the particular type of vehicle. Further, the internal-combustion engines may be of conventional construction. It is also feasible to use two engines of identical power which, in case of an increased output requirement, may be driven in tandem.

It will be understood that the above description of the present invention is susceptible to various modifications, changes and adaptations, and the same are intended to be comprehended within the meaning and range of equivalents of the appended claims.

What is claimed is:

1. A drive system for a vehicle comprising
   (a) wheel-carrying first and second axles;
   (b) a storage battery;
   (c) a motor/generator selectively operable in motor and generator modes and being connected to said storage battery and cooperating with one of said first and second axles for applying electric energy to said battery when operating in the generator mode and for applying a driving torque to said one of said first and second axles when operating in the motor mode;
   (d) first and second internal-combustion engines;
   (e) a transmission connected to the first engine;
   (f) a first clutch for selectively connecting said transmission to or disconnecting said transmission from, one of said first and second axles; and
   (g) a second clutch for selectively connecting said second engine to or disconnecting the second engine from, said transmission; and
   (h) control means for controlling said motor/generator and said first and second internal combustion engines to cause the motor/generator to normally drive the vehicle under normal driving conditions, for causing the first internal combustion engine to supply additional power to drive the vehicle during acceleration and when the motor/generator otherwise cannot supply enough power, and for causing the second internal combustion engine to supply additional power to drive the vehicle when the motor/generator and the first internal combustion engine cannot supply the necessary power for driving conditions: and,
   wherein said motor/generator has a nominal power less than that of either of said first and second internal combustion engines, and, said second internal combustion engine has a nominal power greater than that of said first internal combustion engine.

2. The drive system as defined in claim 1, wherein said motor/generator cooperates with one of said first and second axles and said first clutch connects said transmission to or disconnects said transmission from, the other of said first and second axles.

3. The drive system as defined in claim 1, wherein said motor/generator cooperates with one of said first and second axles and said first clutch connects said transmission to or disconnects said transmission from, said one of said first and second axles.

4. The drive system as defined in claim 3, wherein said motor/generator is connected with said transmission.

5. The drive system as defined in claim 1, further comprising a third clutch for selectively connecting said first engine to or disconnecting the first engine from, said transmission.

6. The drive system as defined in claim 1, wherein said motor/generator is a first motor/generator cooperating with one of said first and second axles; further comprising a second motor/generator selectively operable in motor and generator modes and being connected to said storage battery and cooperating with the other of said first and second axles for applying electric energy to said battery when operating in the generator mode and for applying a driving torque to said other of said first and second axles when operating in the motor mode.

7. The drive system as defined in claim 6, wherein said second motor/generator is connected to said transmission.

8. The drive system as defined in claim 1, wherein said motor/generator cooperates with one of said first and second axles; further comprising a generator connected to said storage battery and cooperating with the other of said first and second axles for applying electric energy to said battery.

9. The drive system as defined in claim 1, wherein the nominal power of said first internal combustion engine is twice the nominal power of the motor/generator.

10. The drive system as defined in claim 1, wherein the first and second internal combustion engines are respectively configured for minimum fuel consumption within their respective power operating ranges.

\* \* \* \* \*